United States Patent
Maxwell et al.

[11] Patent Number: 5,841,928
[45] Date of Patent: Nov. 24, 1998

[54] PLANAR WAVEGUIDES MADE BY USE OF PHOTOSENSITIVE CHANGES TO THE REFRACTIVE INDEX OF A DEPOSITED LAYER

[75] Inventors: Graeme Douglas Maxwell; Benjamin James Ainslie, both of Ipswich, United Kingdom

[73] Assignee: British Telecommunications public limited company, London, England

[21] Appl. No.: 809,045

[22] Filed: Mar. 7, 1997

[30] Foreign Application Priority Data

Sep. 23, 1994 [EP] European Pat. Off. ............. 94306987

[51] Int. Cl.⁶ .................................................... G02B 6/10
[52] U.S. Cl. ........................ 385/129; 385/131; 385/132; 216/74; 216/80; 65/444; 65/448
[58] Field of Search ................................. 385/129, 130, 385/131, 132; 216/74, 80; 65/444, 448

[56] References Cited

U.S. PATENT DOCUMENTS 5,141,549  8/1992  Tumminelli ............................... 65/18.2

FOREIGN PATENT DOCUMENTS

| A 0490095 | 6/1992 | European Pat. Off. . |
| A 0569182 | 12/1993 | European Pat. Off. . |
| A 2191603 | 12/1987 | United Kingdom . |
| A 9316403 | 8/1993 | WIPO . |

OTHER PUBLICATIONS

Mizrahi et al, "Ultraviolet Laser Fabrication of Ultrastrong Optical Fiber Gratings and of Germania–Doped Channel Waveguides", Applied Physics Letters, vol. 63, No. 13, 27 Sep. 1993, New York, pp. 1727–1729.

Barbarossa et al, "Vertically Integrated High–Silica Channel Waveguides on Si", Electronics Letters, vol. 28, No. 5, 27 Feb. 1992, Stevenage, GB, pp. 437–438.

*Primary Examiner*—Phan T. H. Palmer
*Attorney, Agent, or Firm*—Nixon & Vanderhye P.C.

[57] ABSTRACT

Planar waveguides are produced by using radiation to write path regions into a photosensitive layer. Originally, the photosensitive layer had the same refractive index as the confining regions, e.g., it consists of silica doped with oxides of Ge and B. Composite path regions are produced by depositing a glass soot onto a partial region. On sintering the soot melts to fill up the empty spaces and thereby create a composite layer.

19 Claims, 1 Drawing Sheet

PLANAR WAVEGUIDES MADE BY USE OF PHOTOSENSITIVE CHANGES TO THE REFRACTIVE INDEX OF A DEPOSITED LAYER

BACKGROUND OF THE INVENTION

1. Field of the Invention

This invention relates to planar waveguides and, more particularly, it relates to a novel structure of planar waveguides and to a novel method for making planar waveguides. The method of the invention is particularly suitable for making the structures in accordance with the invention.

2. Related Art

Planar waveguides are well-known and they may include active as well as passive regions. For example, a planar waveguide may include lasing structures, e.g. amplifiers, as well as multiplexing, demultiplexing and splitting structures. Planar waveguides are essentially two dimensional in that the pattern of path regions and interconnections can be represented as a flat diagram. Usually, a planar waveguide incorporates a substrate which provides mechanical support for the optical region. Usually, the substrate has a flat surface and an optical layer is supported on this flat surface. It is also known to stack waveguiding layers on top of one another so as to increase the density of operational components. Where layers are stacked it is possible to interconnect them internally. The stacks are also regarded as planar waveguides since each layer is an essentially two dimensional functional arrangement.

Many planar waveguide structures are based on silica glass with various dopants to define the structure. The confining region or regions of the structure are usually implemented in pure silica or silica with dopants such as phosphorous and boron to reduce the melting point of the silica. Processing often involves melting the glass and additives which reduce the melting point of the glass therefore assist manufacture. Melting point depressants should have little (ideally no effect on the optical properties of the system. It is also known to employ different concentrations of melting point depressants so that some, but not all, of the structure may be melted.

In addition to processing aids, the silica glasses contain dopants to affect their optical properties. Germania is a particularly important dopant because germania increases the refractive index of silica and it can be employed to make path regions.

As stated, the functional parts of a planar waveguide are usually made of various forms of silica glass, but the primary substrate is often formed of silicon. Silicon wafers are readily available and they have good mechanical properties so that they form good substrate for the functional regions. A silicon substrate is usually separated from the functional region by a buffer layer of silica glass. This buffer layer usually serves as part of the confining region of the waveguiding structure.

Planar waveguides are usually prepared by a complicated series of processes which involve the deposition of a layer over the whole of the area followed by the removal of unwanted portions in order to produce a desired pattern. This is achieved by well established mask/etch processes.

Flame hydrolysis constitutes an important deposition process for making silica glass layers. Flame hydrolysis utilises an oxygen/hydrogen flame and various volatile reactants are introduced into the flame. In order to produce glasses of accurately defined quantitative composition it is necessary to measure the quantities of the reagents into the flame. To produce a silica glass, silicon tetrachloride is introduced to the flame. Other reagents which are introduced into the flame include $GeCl_4$, $PCl_3$, $BCl_3$, $TiCl_4$, $POCl_3$. The reaction which occurs in the flame converts the reagents to the oxides and, when a mixture of reagents is introduced into the flame, the reaction product is an intimate mixture of the individual reaction products. The product of the reaction takes a physical form of fine particles and these are usually designated as "soot".

The soot produced by the reaction deposits everywhere in the form of thick porous layer of low density. Therefore, the deposition involves a second step in which the layer of soot is sintered, i.e., heated to its melting point or slightly above its melting point. During sintering the individual particles melt and fuse with one another and the thick porous layer consolidates to a much thinner layer which is without voids. The amount of soot deposited is controlled so that, after sintering, the thin layer has the desired thickness.

A brief description of the preparation of a conventional structure will now be given.

The starting point, i.e., the primary substrate, is a silicon wafer having a flat surface. As a preliminary the surface is oxidised to produce a buffer layer (of pure silica) which acts as a confining region in the ultimate product. The buffer layer separates the path regions from the silicon substrate. Having produced the buffer layer, a path layer of silica/germania soot is deposited and sintered to produce a uniform path layer which overlies the buffer layer. If desired, small amounts of melting point depressants, e.g., $B_2O_3$, may be incorporated so that, during the sintering of the path layer the buffer layer does not melt. At this stage, the path layer is shaped using conventional mask/etch technology. This removes the unwanted portions of the path layer leaving behind the intended path regions in the form of ridges which stand on the buffer layer. The workpiece is returned to the deposition equipment and a thick layer of silica soot is deposited. It is appropriate that this layer contains melting point depressants in order that it can be melted without affecting the previously deposited path regions. A thick layer of soot is usually deposited and this covers the ridges and a uniform surface is produced. When this thick layer is sintered, the surface remains flat under the control of surface tension and the result is a confining region which covers the ridges and penetrates between them so that a waveguiding structure is produced having silica/germania path regions enclosed between a confining region consisting essentially of silica. It is emphasised that the mask/etch processing which shapes the path regions involves a complicated series of operations. The preparation of the final covering layer utilises enough soot to form a thick layer and this layer will penetrate between the upstanding regions as mentioned.

The preparation of planar waveguiding structures with active regions, e.g., amplifiers, is more complicated because it is necessary to have a variety of different dopants in the path regions. Thus the final product has a more complicated structure and this requires preparative techniques which are substantially more complicated than the simple method described above.

In ELECTRONICS LETTERS dated 18th Aug. 1994 (Vol 30 No 17) Svalgaard et al describe the preparation of a germanosilicate film waveguide fabricated by plasma enhanced chemical vapour deposition using direct writing, i.e., the path regions are created by exposure to suitable radiation. The path regions are written into buffer-corecladding layers having refractive indices of 1.459, 1.475 and 1.459 respectively.

European patent specification 0 569 182 A1 uses a photosensitive technique to prepare waveguides. A layer of germanosilicate is deposited between two layers of vitreous silica. Clearly, the centre layer has a higher refractive index than the outer layers. A portion of the germanosilicate layer is exposed to radiation to create a core region. The confining region which surrounds the core does not have a uniform refractive index and the publication does not suggest how to achieve this.

International publication WO 93/16403 discusses the preparation of planar waveguiding structures using processing aids. The processing aids comprise two additives and the ratio is selected so that the refractive index is controlled to a target value. This publication does not mention the possibility of irradiating the glass with focused actinic radiation and this possibility is not suggested.

U.S. Pat. No. 5,141,549 describes techniques for incorporating rare earths into planar optical waveguides formed of silica.

SUMMARY OF THE INVENTION

It is an object of this invention to simplify the preparation of planar waveguides, e.g. to simplify the preparation of the composite layers which are needed to make more complicated structures. In particular, it is an object of this invention to prepare path regions without the use of etching techniques.

This invention utilises the discovery that certain glasses are photosensitive and exposure to suitable radiation increases the refractive index. This discovery makes it possible to produce path regions by exposing the glass to a suitable pattern of radiation, e.g., by using masks or by using a moving spot of focused radiation. It is important to recognise that, even when masks are used, etching is not used.

In particular, it has been discovered that silica glasses which are saturated with hydrogen are particularly sensitive to radiation, especially when the silica glass contains germania. This invention utilises this phenomenon, but the photo-sensitive glass contains germania and boron (in the form of the oxide $B_2O_3$) wherein the mole ratio B:Ge is selected to control the refractive index of the glass. In particular, it is the lower refractive index, i.e. the refractive index before exposure, which is controlled. In most applications, the refractive index before exposure is controlled to be equal to the refractive index of the confining region, e.g., the buffer and cladding layers. When the photo-sensitive glass is exposed to radiation, the refractive index rises to produce path regions which are surrounded by confining regions as is conventional in waveguide technology.

In accordance with the invention a uniform path layer is deposited, said path layer having the same refractive index as the confining regions, and after deposition the path layer is selectively exposed to radiation to increase the refractive index of the exposed regions in order to produce path regions. Preferably, a confining layer is deposited after the path layer and the exposure is carried out through this deposited confining region.

In accordance with the preferred embodiment of the invention, a uniform path layer is deposited onto a substrate having an exposed layer of a silica glass wherein the path layer is formed of a silica glass containing oxides of Ge and B in a mole ratio such that the deposited path layer has the same refractive index as the underlying silica layer and thereafter depositing a further silica layer on top of the path layer wherein the refractive index is substantially constant throughout all three layers. After deposition of the second silica layer the substrate is placed in a pressure vessel wherein it is exposed to a high pressure atmosphere of hydrogen at low temperatures. Suitable pressures are within the range 1 to 50 MPa. The temperature in the vessel is conveniently at ambient temperature, e.g. 0° C. to 50° C. During its time in the pressure vessel hydrogen diffuses through the covering silica layer and saturates the layer containing germanium and boron and this sensitises that layer. The device is exposed to radiation via a mask so that the intended path region gets irradiated. This irradiation causes an increase in the refractive index of the glass so that path regions are produced. After exposure the hydrogen will dissipate slowly but no action is needed to achieve this. When the hydrogen has dissipated the photo-sensitivity will be lost so that the structure becomes stable. It should also be recognised that the glass only becomes photo-sensitive in the presence of both germanium and hydrogen so that the upper and lower confining regions are not affected by the exposure.

It will be appreciated that many silica glass systems can be rendered photo-sensitive by saturation with hydrogen and the presence of both boron and germanium enables the refractive index to be controlled.

This invention is also applicable to making composite layers for path regions, e.g., layers which will eventually have differently doped path regions interconnected to make complicated structures. According to this invention, composite path region layers can be deposited by the following sequence:

(a) A uniform layer of a first path region composition, e.g. a composition which contains a lasing dopant such as erbium is deposited over an entire substrate;

(b) Unwanted parts of the deposited layer are removed by mask/etch technology so as to leave behind a desired structure, e.g. path regions;

(c) Depositing in the form of a soot a second glass composition in a controlled amount calculated to fill the free space;

(d) Sintering the soot of the second glass composition whereby said soot consolidates into the free space so as to recreate a single layer said single layer having a composite composition.

The following considerations are relevant to steps (b), (c) and (d) as mentioned above. During step (d) the glass (soot) deposited in step (c) melts sufficiently to flow over the desired structure which remains after the etching in step (b) and it flows down either side of said desired structure. However, a thin residual layer may remain to cover the desired structure and the following comments apply to this residual layer.

If the residual layer causes an unacceptable deterioration in the performance of the finished product it can be removed by controlled etching. This etching is carried out immediately after sintering when the surface is uniform and planar. A thin surface layer is removed so that the desired structure is exposed.

The method is particularly intended for the production of path regions and in this case it may not be necessary to remove the residual layer because it has little or no adverse effect. The size of a path region is controlled by optical considerations and its dimensions are so small that the residual layer will be very thin, e.g. 0.5 $\mu$m. If it is formed of path region material, it will have the same refractive index as the path region and it will merely constitute a slight thickening of the path region. This may not affect ultimate performance. Alternatively, when the photosensitive technique is used, the residual layer will be comprised in the continuing region and it will have the same refractive index as confining material. Thus its effect upon the ultimate performance will be undetectable.

During the sintering of the second deposited glass composition there is sufficient melting of both layers so that the different compositions become optically unified at the boundaries. Thus, when path regions are created across the whole of the composite layer satisfactory optical transmission between different compositions is facilitated.

It is a preferred embodiment of our invention to produce path regions extending into different glass compositions by utilising both techniques as described above. According to this preferred embodiment, the composite path layer contains germanium and boron in such amounts that the refractive index is not only uniform throughout the layer but equal to the confining regions above and below the path region. After saturation with hydrogen the composite region is exposed as described above to produce path regions which extend into several different glass compositions.

The invention also includes planar waveguide structures having path regions located in a layer of glass wherein said layer is a silica glass containing germanium and boron in a mole ratio which is substantially constant throughout the layer. These structures are conveniently produced by the methods described above and said structures are considered to be novel in their own right.

BRIEF DESCRIPTION OF THE DRAWINGS

The invention will now be described by way of example with reference to the accompanying drawings wherein.

DETAILED DESCRIPTION OF EXEMPLARY EMBODIMENTS

EXAMPLE 1

Figure 1:
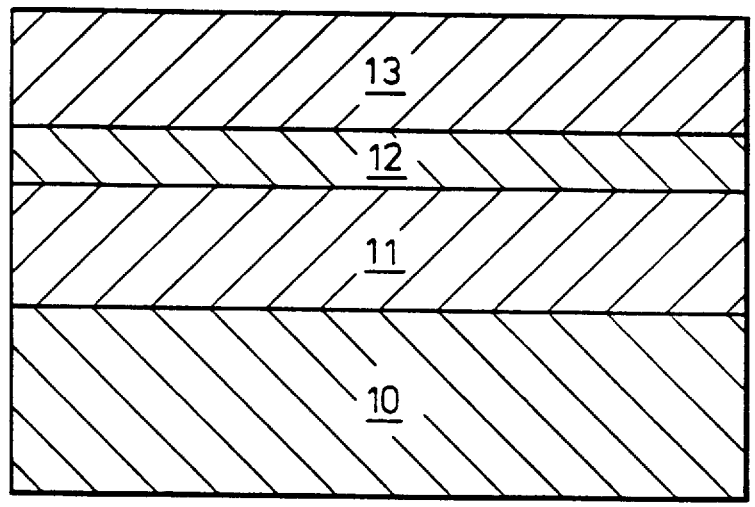
FIG. 1 is a cross-section showing a workpiece ready for patterning.

FIG. 1 shows a workpiece which is ready for saturation with hydrogen as a preliminary to patterning to make waveguides. At this stage of the process the workpiece comprises four layers, each of which is substantially uniform. As shown in FIG. 1 the four layers are as follows. There is a substrate 10 which is formed of silicon and the primary purpose of the substrate 10 is to support the other layers. Next to the substrate 10 there is a buffer layer 11 which is formed of silica. In the finished product, the buffer layer 11 will form part of the confining region of the waveguiding structure and upper layer 13 constitutes another portion of the confining region of the waveguiding structure. Layer 13 is formed of silica doped with oxides of phosphorous and boron. In between, and in contact with each of the two layers 11 and 13, there is a path layer 12 which is formed of silica doped with oxides of boron and germanium.

The buffer layer 11 is 16 $\mu$m thick and it is formed of substantially pure silica having a refractive index of 1.446 at a wavelength of 1.523 $\mu$m. The path layer 12 is 5 $\mu$m thick and, as stated above, it is formed of silica doped with oxides of Ge and B. The ratio of Ge:B is selected so that the path layer 12 has the same refractive index as the buffer layer 11.

The upper layer 13 is 16 $\mu$m thick and it is formed of silica doped with oxides of boron and phosphorous. Phosphorous tends to increase the refractive index and boron tends to reduce the refractive index and both of these elements tends to reduce the melting point of the silica. The ratio of the phosphorous and boron is adjusted so that the refractive index is equal to that of the buffer layer 11. It is emphasised that the refractive indices of layers 12 and 13 are adjusted to be equal to that of the buffer layer 11 and this means that the whole structure, i.e., layers 11, 12 and 13 has a constant refractive index.

The melting point of the layers is also of some significance. Layer 11 is of substantially pure silica and, therefore, it has the highest melting point of any of the layers. Layer 12 contains boron which adjusts the refractive index (to cancel out the increase due to the presence of germanium) but the boron also reduces the melting point of layer 12. Thus layer 12 has a lower melting point than layer 11. Layer 13 contains both phosphorous and boron and the amounts are balanced so that the refractive index remains equal to that of the buffer layer 11. However, both phosphorous and boron reduce the melting point of silica so that the layer 13 has an even lower melting point than the layer 12.

The layered structure illustrated in FIG. 1 is prepared by conventional methods. The silica substrate 10 is commercially available and the buffer layer 11 is produced by oxidising this substrate in a suitable atmosphere. The oxidation directly produces a densified layer of pure $SiO_2$. Layer 12 is deposited by flame hydrolysis and it is originally in the form of a thick layer of porous soot. During the disposition of this layer $SiCl_4$, $BCl_3$ and $GeCl_4$ were introduced into the flame to produce soot of the required chemical composition. The absolute dosage rates of the three reactants is less important than their relative amounts. In order to achieve the desired refractive index (1.446 as explained above) the flow rates were in the following volume ratio:

$$SiCl_4:BCl_3:GeCl_4=3.75:2.5:1.$$

After the deposition just described, the workpiece is removed from the deposition apparatus and placed in a furnace where it is heated at 750° C. for about one hour. This sinters the layer and causes the thick layer of soot to consolidate to a thin solid layer as described above.

Finally, the workpiece is returned to the deposition equipment where flame hydrolysis is used to deposit top layer 13 as described. $SiCl_4$, $BCl_3$ and $PCl_3$ were introduced into the flame in the ratios needed to produce the refractive index of 1.446. After consolidation in the furnace the structure illustrated in FIG. 1 is produced.

The next stage of the process comprises the patterning of path layer 12 to produce the path regions. This patterning is achieved by exposing layer 12 to a similar pattern of ultraviolet radiation. As originally deposited glass of layer 12 has little or no photosensitivity and it is necessary to increase the photosensitivity of the glass. The photosensitivity is such that where the glass is exposed to ultraviolet radiation its refractive index increases. The photosensitivity was achieved by saturating the device, and layer 12 in particular, with hydrogen. In the presence of both hydrogen and germanium the glass is photosensitive. In order to saturate layer 12 with hydrogen the workpiece was placed in a pressure chamber which contained hydrogen at a pressure of 17 MPa and a temperature of 20° C.

As an alternative to the high pressure saturation just described, layer 12 is subjected to chemical reduction. This reduction can be achieved by exposing the wafer to an atmosphere containing hydrogen at an elevated temperature (e.g., 750° C.) for approximately one hour. Since deposition of a covering layer involves oxidation and since hydrogen will defuse through a covering layer, this reduction is carried out after deposition of layer 13. It is emphasised that this reduction confers permanent photosensitivity. (The reducation raises, slightly, the refractive index of the path layer but the B:Ge ration is adjusted to compensate.)

The high pressure/low temperature process described above is preferred. It confers only temporary photosensitivity because the hydrogen dissipates afterwards. When layer 12 has been photosensitised as described above, the device is patterned by optical exposure. This is conveniently achieved by projecting ultraviolet light onto the workpiece from a projector which includes masks so that only the intended path regions are illuminated. In the region of illumination, the refractive index increases by 0.008 (from an original value of 1.446 to a final value of 1.454). This corresponds to a refractive index change of 0.5%. After exposure the hydrogen will dissipate leaving behind a waveguide structure.

The final structure is not illustrated since it is substantially as shown in FIG. 1. The irradiated regions of layer 12 will have increased their refractive index but the refractive indices of the buffer 11 and the top layer 13 will be substantially unchanged. Furthermore the un-irradiated portions of layer 12 will also retain their original refractive index. Thus a satisfactory waveguide structure has been produced. It will be appreciated that irradiation will not affect the Ge:B ratio in layer 12. Since this ratio was constant throughout the layer after deposition it will remain constant after exposure.

The method of the invention considerably simplifies the preparation of a planar waveguiding structure. In particular, no etching steps were used.

EXAMPLE 2

Figure 2:
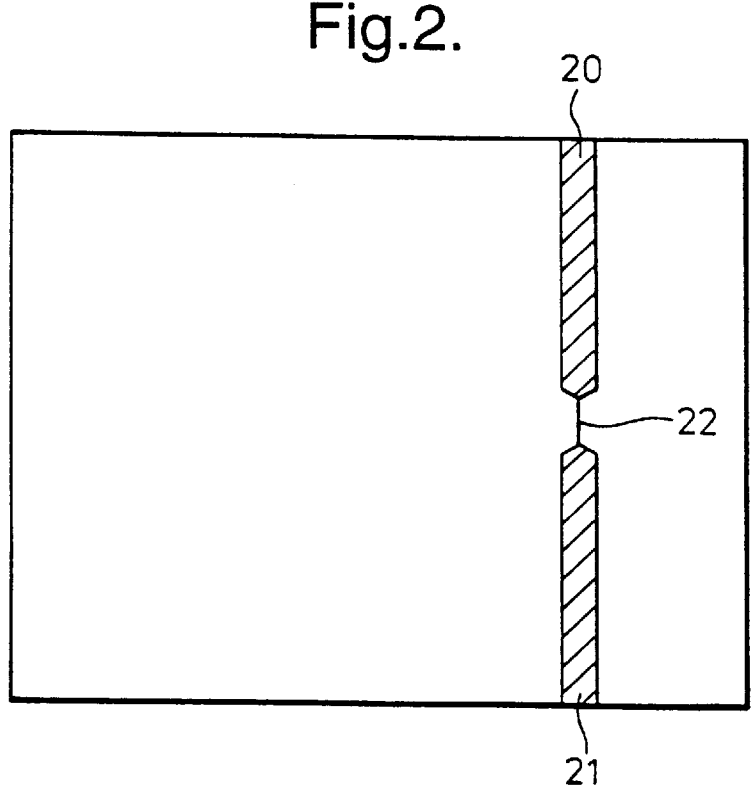
FIG. 2 illustrates a composite path region.

FIG. 2 illustrates an intermediate stage in the preparation of a waveguide wherein the path region comprises two different chemical compositions. More particularly, the structure is intended as a photonic amplifier using erbium doped path regions for amplification. It is also necessary to provide other, erbium free, path regions for connection. In other words, some but not all of the path region is doped with erbium.

It is convenient to commence the preparation of this device with a substrate 10 and a buffer layer 11 as illustrated in FIG. 1. On to the substrate there is deposited and sintered a uniform layer of silica doped with germanium and boron. However, there is an important distinction from FIG. 1 in that the Ge:B ratio is different. In this case the boron is intended solely as a melting point depressant and the relative amount of germanium is higher than in Example 1 so that the desired refractive index of the path region is produced. After sintering, the layer is masked and etched so that there remains behind only the intended path region. After this first deposition, a second deposition is carried out to produce a soot layer containing phosphorous which both reduces the melting point and increases the refractive index to that of the desired path region. The soot is lightly sintered so that it achieves mechanical stability but it still remains porous. After this light sintering the layer is soaked in an alcoholic solution of erbium nitrate. After soaking, the sintering is completed to consolidate the second composition.

The amount of second composition deposited is calculated so as to replace the material removed in the first etching. During consolidation, the second deposited glass flows off the first path region to leave a composite layer comprising silica doped with Ge:B as a first composition and silica doped with P/Er as a lasing composition. During the final sintering the two glasses form a good optical connection.

The final sintering produces a complete composite layer. That is, it comprises a complete layer over the whole substrate but the layer is composite in that it comprises the two chemical compositions specified above. The composite layer is patterned and selectively etched so that only the intended path regions are left behind. The path regions produced in the first etching are still retained and erbium doped glass is removed to leave a composite path region which comprises both erbium doped and erbium free portions.

FIG. 2 constitutes a plan view showing the nature of the path regions left at this stage. It should be noted that the path regions comprise an erbium free portion 20 and a lasing portion 21 which includes erbium. Higher gains can be achieved by using longer path regions and a circuitous route is appropriate to increase the path length. It should be noted that the doped 21 and undoped 20 sections are connected via tapers 22 in order to improve optical connections.

After the path regions have been shaped by mask/etch technology, a final confining region, corresponding to layer 13 of FIG. 1, is deposited. In sintering, this layer will provide a complete confining region according to conventional practice.

It will be appreciated that this method provides a composite path region but it does not use the direct writing technique described in Example 1. It is emphasised that, although some of the path regions contain both germanium and boron, the ratio is selected to give a refractive index which is higher than that of the buffer layer 11; in 1 the ratio is selected to give the same refractive index as in the buffer layer 11.

EXAMPLE 3

Example 3 combines the techniques of Examples 1 and 2. This combination of techniques is not separately illustrated. According to this modification a layer of erbium doped silica is deposited and patterned using mask/etch technology to leave behind the desired lasing path regions. This is substantially the same as in Example 2. After etching, a layer corresponding to layer 11 of Example 1 is deposited in such amount that it fills up the spaces between the path regions produced in the first etching process. In this modification, there is no second etching and the covering layer 13 is provided as described in Example 1. Finally, the direct writing as described in Example 1 is applied but only to the second deposited part of the composite layer. It will be appreciated that this technique takes one etching process instead of two as required in Example 2.

In these examples, it was stated that the direct writing is achieved by a projector which includes a mask. Other direct writing techniques are available. For example, it is possible to deposit a mask on the surface of layer 13 and selective irradiation is achieved by providing uniform illumination onto this mask. After illumination it may be convenient to remove the mask. It is emphasised that although this technique uses a mask it does not use etching. Another form of direct writing takes the form of moving a focused spot of intense radiation along the intended path region. There are many ways of applying the desired radiation pattern in order to achieve the direct writing of the waveguide.

What is claimed is:

1. A planar wave guide which comprises:
   first and second confining layers and a center layer located between and in contact with each of said first and second confining layers,
   wherein a portion of said center layer comprises both path regions and confining regions,
   said portion being formed of a host glass composition with a first additive to increase the refractive index thereof and a second additive to decrease the refractive index thereof,
   the ratio of said first and second additives being such as to provide a refractive index equal to that of the first and second confining layers,
   wherein one of the additives is adapted to increase the photosensitivity of the host glass and the refractive index variation associated with the path region is substantially independent of the chemical composition of the glass.

2. A planar wave guide as in claim 1, wherein said portion forms the whole of the center layer.

3. A planar wave guide as in claim 1 wherein:
   the host glass comprises silica,
   the first additive comprises an oxide of germanium, and
   the second additive comprises an oxide of boron.

4. A planar waveguide as in claim 3, wherein the first and second layers are formed of a silica glass composition with a refractive index substantially equal to that of silica.

5. A planar waveguide as in claim 4, wherein the first confining layer comprises substantially pure silica and the second confining layer comprises silica containing oxides of phosphorous and boron to reduce its melting point.

6. A planar waveguide as in claim 5, which also includes a primary substrate for mechanical support, said primary substrate being in contact with the first confining layer and said primary substrate being formed of silicon.

7. A method of making a planar waveguide which waveguide includes confining regions having a first refractive index and path regions having a second, higher, refractive index, which method comprises:
   depositing a path layer comprising a portion of photosensitive glass, and
   selectively illuminating the photosensitive glass to increase its refractive index,
   wherein said illumination creating path regions said photosensitive glass contains a balanced pair of additives, namely an additive related to photosensitivity and another additive to adjust the refractive index to the first value.

8. A method as in claim 7, wherein the photosensitive glass is first deposited with little or no photosensitivity and thereafter treated to increase its photosensitivity.

9. A method as in claim 8, wherein:
   the path layer is covered with a confining layer before treatment to increase the photosensitivity, and
   said illumination is carried out through said covering path layer.

10. A method as in claim 7 wherein the whole of the path layer is formed of the photosensitive glass.

11. A method as in claim 7, wherein:
    the confining regions are formed of silica glass or silica glass doped with melting point depressants giving a refractive index equal to that of silica, and
    the photosensitive glass comprises silica with an oxide of germanium as the additive relating to photosensitivity and an oxide of boron as the additive to adjust the refractive index.

12. A method of making a planar waveguide as in claim 7, wherein the deposition of the path layer comprises:
    depositing a first glass composition and selectively etching said layer to produce path regions of said first glass composition,
    thereafter depositing a soot of a potentially photosensitive glass in an amount to replenish the removed material,
    fusing said photosensitive soot to produce a composite layer comprising said path regions and said potentially sensitive glass optically connected thereto, and
    selectively illuminating said photosensitive glass to increase its refractive index and thereby produce path regions interconnected with the path regions of the first glass composition.

13. A method of producing a planar waveguide path layer onto a substrate which method comprises:
    depositing a layer of a first glass composition,
    selectively etching said layer to remove unwanted material and leave behind path regions,
    depositing a second glass composition in the form of a soot and sintering said second glass composition, the amount of the second glass composition which is deposited replace,
    wherein the amount of removed material,
    whereby molten composition fills the space created by said selective etching to produce a composite layer which comprises said second glass composition optically connected to the previously deposited path regions, and
    selectively etching said composite layer to produce interconnected path regions of two different glass compositions.

14. A method as in claim 13, wherein the first glass composition contains a lasing dopant and the second glass composition contains no lasing dopant.

15. A method to claim 14, wherein the lasing dopant comprises erbium.

16. A method of producing a planar waveguide, which method comprises:
    depositing a path layer of a first glass composition and selectively etching said layer to produce path regions of said first glass composition,
    thereafter depositing a soot of a second glass wherein the amount of said soot replenishes the removed material,
    fusing said soot to produce a composite layer comprising said path regions and said second glass optically connected thereto, and
    selectively illuminating said photosensitive glass to increase its refractive index to produce path regions interconnected with the path regions of the first glass composition wherein said second glass is either photosensitive as deposited or it is treated to render it photosensitive before exposure.

17. A method as in claim 16, wherein the first glass composition contains a lasing dopant and the second glass contains no lasing dopant.

18. A method according to claim 17, wherein the lasing dopant comprises erbium.

19. A method of preparing a planar waveguide starting with a silicon wafer as primary substrates which method comprises:
    (a) oxidizing the surface of the substrate to produce thereon a buffer layer comprising substantially pure silica said buffer layer being part of the confining region in the finished product;

(b) depositing on the buffer layer a path layer being a silica glass composition;

(c) depositing on the path layer a silica confining layer;

(d) exposing the result of step (c) to high pressure hydrogen whereby hydrogen diffuses through the confining region to saturate the path layer;

(e) exposing the path layer to a pattern of illumination through the confining region whereby said illumination selectively increases the refractive index to produce path regions within the path layer;

wherein the silica glass composition deposited in step (b) contains oxides of germanium and boron to enhance photosensitivity and to adjust the refractive index to that of the buffer layer and the silica containing layer deposited in step (c) is doped with oxides of phosphorous and boron to reduce the melting point and to adjust the refractive index to that of the buffer layer.

* * * * *